(12) United States Patent
Hemminger et al.

(10) Patent No.: US 9,897,396 B2
(45) Date of Patent: Feb. 20, 2018

(54) HEAT EXCHANGER

(71) Applicant: MAHLE International GmbH, Stuttgart (DE)

(72) Inventors: Roland Hemminger, Esslingen (DE); Mark Schienemann, Stuttgart (DE); Wolfgang Reier, Schwaikheim (DE)

(73) Assignee: MAHLE International GmbH, Stuttgart (DE)

( * ) Notice: Subject to any disclaimer, the term of this patent is extended or adjusted under 35 U.S.C. 154(b) by 475 days.

(21) Appl. No.: 14/535,786

(22) Filed: Nov. 7, 2014

(65) Prior Publication Data

US 2015/0107808 A1 Apr. 23, 2015

Related U.S. Application Data

(63) Continuation of application No. 12/198,561, filed on Aug. 26, 2008, now Pat. No. 8,881,796.

(30) Foreign Application Priority Data

Aug. 28, 2007 (DE) .................. 10 2007 040 793

(51) Int. Cl.
*F28F 9/013* (2006.01)
*F28F 9/02* (2006.01)
(Continued)

(52) U.S. Cl.
CPC .......... *F28F 9/0131* (2013.01); *F02M 26/32* (2016.02); *F28F 9/02* (2013.01); *F28F 9/0219* (2013.01);
(Continued)

(58) Field of Classification Search
CPC .......... F28F 9/0131; F28F 9/02; F28F 9/0219; F28F 9/0224; F28F 21/04; F28F 21/067;
(Continued)

(56) References Cited

U.S. PATENT DOCUMENTS 240,220 A 4/1881 Ashcroft
1,562,682 A * 11/1925 Braun ...................... F28B 1/02
165/110

(Continued)

FOREIGN PATENT DOCUMENTS

DE 27 03 528 8/1978
DE 199 53 785 A1 5/2001
(Continued)

OTHER PUBLICATIONS

Official Action dated Jul. 15, 2013 in related European Application No. 08012842.4 (7 pgs.).

*Primary Examiner* — Tho V Duong
(74) *Attorney, Agent, or Firm* — Muncy, Geissler, Olds & Lowe, P.C.

(57) ABSTRACT

A heat exchanger for an exchange of heat between a first fluid and a second fluid includes a block including: a plurality of flow ducts configured to be traversed by the first fluid, and a housing that holds the flow ducts and is configured to be traversed by the second fluid; a base connected to the block, the base including one or more passage openings for the flow ducts, the base comprising a first base part and a second base part; and at least one casing cover that is in fluid-communication with the flow ducts and that is attached to the base.

21 Claims, 12 Drawing Sheets

(51) Int. Cl.
  *F02M 26/32* (2016.01)
  *F28F 21/04* (2006.01)
  *F28F 21/06* (2006.01)
  *F28F 21/08* (2006.01)

(52) U.S. Cl.
  CPC ............. *F28F 21/04* (2013.01); *F28F 21/067* (2013.01); *F28F 21/08* (2013.01); *F28F 2009/029* (2013.01); *Y02T 10/121* (2013.01)

(58) Field of Classification Search
  CPC .... F28F 21/08; F28F 2009/029; F02M 26/32; Y02T 10/121
  USPC ......................................................... 165/158
  See application file for complete search history.

(56) References Cited

U.S. PATENT DOCUMENTS

| | | |
|---|---|---|
| 1,599,370 A | 9/1926 | Muhleisen |
| 2,512,748 A | 6/1950 | Lucke |
| 2,783,980 A | 3/1957 | Christensen |
| 3,111,167 A | 11/1963 | Young |
| 3,258,068 A * | 6/1966 | Hollister ............... F28F 9/02 165/158 |
| 3,489,209 A | 1/1970 | Johnson |
| 3,603,383 A * | 9/1971 | Michael ............... F22B 1/026 165/158 |
| 3,948,315 A | 4/1976 | Powell |
| 4,190,101 A | 2/1980 | Hartmann |
| 4,244,423 A | 1/1981 | Thut et al. |
| 4,445,568 A * | 5/1984 | Nguyen-Thanh ....... F22B 37/22 122/32 |
| 4,700,773 A * | 10/1987 | Kehrer ................ F22B 1/1884 165/134.1 |
| 4,972,903 A | 11/1990 | Kwok |
| 5,048,596 A | 9/1991 | Lu |
| 5,051,020 A | 9/1991 | Schleicher |
| 6,250,380 B1 | 6/2001 | Strahle et al. |
| 6,269,870 B1 | 8/2001 | Banzhaf et al. |
| 6,920,918 B2 | 7/2005 | Knecht et al. |
| 7,048,042 B2 | 5/2006 | Juschka |
| 7,055,586 B2 | 6/2006 | Sakakibara et al. |
| 7,128,137 B2 | 10/2006 | Dilley et al. |
| 2003/0019616 A1 | 1/2003 | Hayashi et al. |
| 2004/0134640 A1 | 7/2004 | Sakakibara et al. |
| 2006/0048759 A1 | 3/2006 | Hendrix |
| 2007/0029076 A1 | 2/2007 | Augenstein et al. |
| 2007/0175612 A1 | 8/2007 | Hendrix |

FOREIGN PATENT DOCUMENTS

| | | | |
|---|---|---|---|
| DE | 102 14 467 A1 | 10/2003 | |
| DE | 103 02 708 A1 | 7/2004 | |
| DE | 10 2004 047 901 A1 | 6/2005 | |
| DE | 10 2004 001 787 A1 | 12/2005 | |
| DE | 10 2004 051 207 A1 | 5/2006 | |
| DE | 10 2005 012 761 A1 | 9/2006 | |
| EP | 1 154 143 A1 | 11/2001 | |
| EP | 1 544 564 A1 | 6/2005 | |
| EP | 1 710 526 A1 | 10/2006 | |
| FR | 2 251 794 A1 | 6/1975 | |
| FR | 2712385 B1 * | 10/1996 | ............. B23P 15/26 |
| FR | 2742529 B1 * | 1/1998 | ............ F28F 9/0226 |
| JP | 2007-077839 A | 3/2007 | |
| WO | WO 2004/09457 A1 | 1/2004 | |

\* cited by examiner

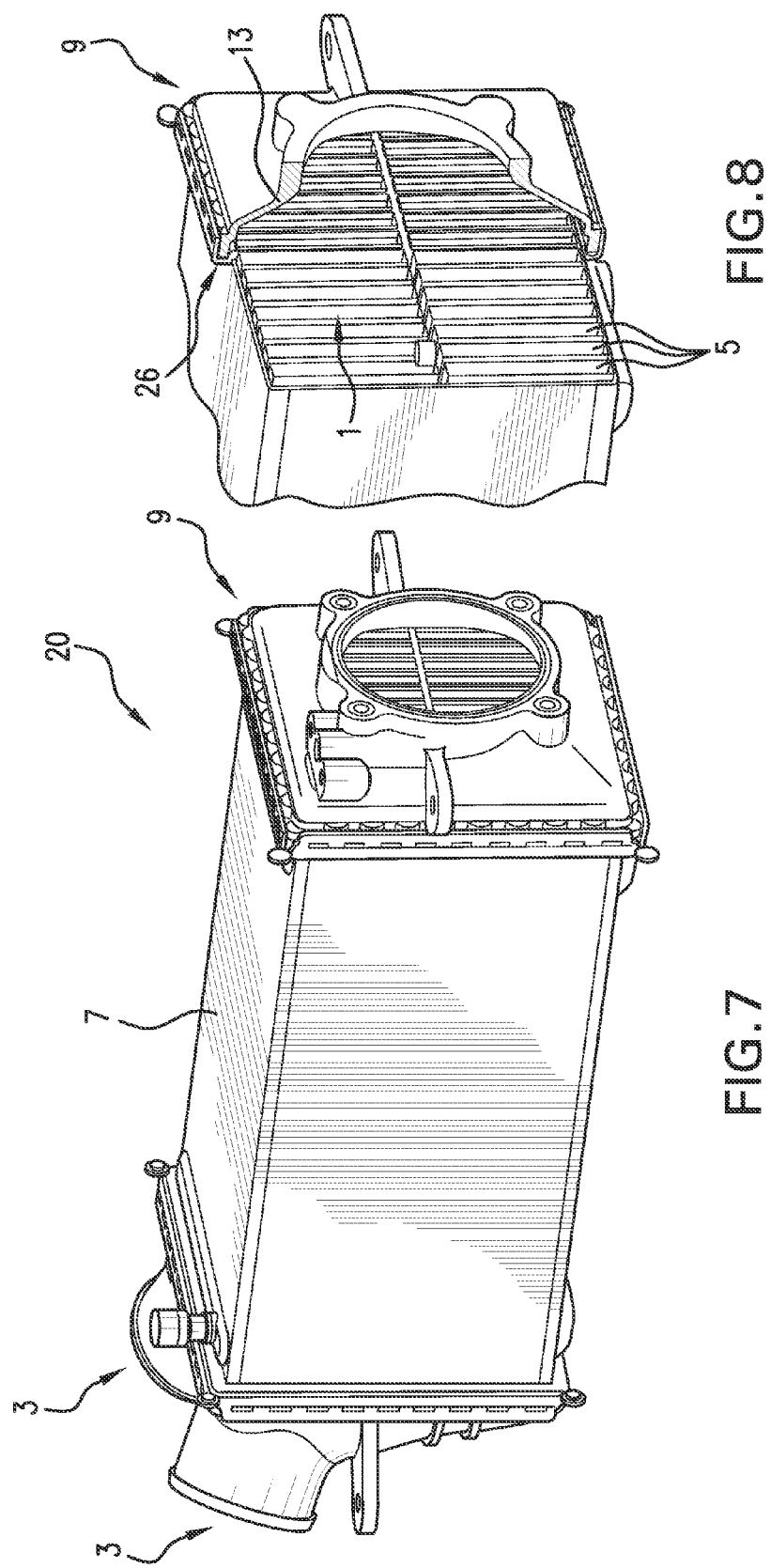

HEAT EXCHANGER

CROSS-REFERENCE TO RELATED PATENT APPLICATIONS

This application is a continuation of U.S. patent application Ser. No. 12/198,561, filed Aug. 26, 2008; which claims foreign priority under 35 U.S.C. § 119(a) based on Federal Republic of Germany Application No. 10 2007 040 793.0, filed Aug. 28, 2007, the entire contents of both of which, including the specification, drawings, claims and abstract, are incorporated herein by reference.

BACKGROUND OF THE INVENTION

The invention relates to a heat exchanger for an exchange of heat between a first fluid and a second fluid, having: a block for the separate and heat-exchanging guidance of the first and second fluids, which block has a number of flow ducts which can be traversed by the first fluid and a housing which holds the flow ducts and which can be traversed by the second fluid; at least one casing cover which is flow-connected to the flow ducts, a base which is fixed to the casing cover and which is provided with one or with a plurality of passage openings for flow ducts. The invention also relates to a use of the heat exchanger.

In a known heat exchanger, a tank cover may be formed from deep-drawn sheet metal which is soldered to the block during the production process. Although this has advantages in the high-temperature range, add-on components such as for example brackets or flanges for sensors must be produced as additional parts from sheet metal and connected to the tank cover before the soldering process, which makes the production process more complicated. Furthermore, a more complex tank shape can generally no longer be produced as a deep-drawn part, such that, in this case, production must take place by means of casting, and the tank cover must generally be welded to the block. Said type of tank has proven to be comparatively expensive and complex to produce specifically in the case of more complex structural shapes.

One cost-effective alternative to heat exchangers of said type is a heat exchanger of the type specified in the introduction, in which the tank has a tank cover composed of plastic. Here, it is possible to realize comparatively complex structural shapes, with it being by all means possible, with corresponding plastic materials and a corresponding design of the tank, to also realize higher temperature ranges. Examples of tank covers composed of plastic are specified in DE 10 2004 051 207 A1 and DE 10 2004 047 901 A1.

There are fundamentally different ways of attaching a plastic tank cover to the heat exchanger, such as for example connections as shown in WO 2004/09457, FIG. 2 or DE 199 53 785 A1, FIG. 4.

DE 10 2005 012 761 A1 discloses a heat exchanger of the type specified in the introduction, having a housing composed of two side parts and two housing covers, with the side parts being soldered to the block and the housing cover being welded to the side parts. Furthermore, collecting tanks composed of plastic are mechanically connected, with the interposition of a seal, to tube plates. The mechanical connection is achieved by bending lugs of the tube plates over the edge of the collecting tank. Said type of heat exchanger has room for improvement.

What is desirable is a design of a heat exchanger which is comparatively simple to produce and in which it is nevertheless possible to realize comparatively complex structural shapes. This relates in particular to the design of a base of the heat exchanger.

What is also desirable is a further advantageously improved connection of a tank cover, in particular of a tank cover composed of a non-metallic material, to a metal part, to the base of a heat exchanger, preferably so as to provide an improved sealing action. Also desirable is an improvement to a housing of the heat exchanger.

SUMMARY OF THE INVENTION

The invention addresses this; it is an object of the invention to specify a heat exchanger in which the base is of improved design. In particular, it is intended that a base is comparatively simple to produce. It is also intended that the tank cover of a tank is connected to the base in a particularly advantageous manner, and in particular that a tank cover composed of a non-metallic material is connected in an advantageous manner to the metal base, preferably so as to provide an improved sealing action. In particular, it is a further object of the invention to specify a heat exchanger having an improved housing.

The object is achieved by means of a heat exchanger of the type specified in the introduction, in which it is provided according to the invention that the base is composed of a first base part and a second base part.

The invention has recognized that a two-part base can be of advantageous design, and a two-part base concept leads to simplified production of the base and at the same time to a greater degree of reliability in the production process. Firstly, the base should be of comparatively thick-walled design in the region of the passage openings for the flow ducts, in particular in an inner region, in order to obtain a good bundling capability and for example also to obtain good soldering of the base and flow ducts. Secondly, it can be advantageous for the base to be of comparatively thin-walled design in relation thereto in a fastening region, in particular outer region, in particular for fixing a tank cover to the base by means of a corrugated slot flange. This has the advantage that installation space can be saved and abrasive forces are kept comparatively low. By means of a corresponding punching process, the material can be punched out so as to form a fastening structure. By means of the material reduction, for example in the edge region of a base, it is possible for a tank cover fastening to be designed with a considerably reduced installation space requirement. On the basis of this consideration, the invention has surprisingly found that, in the event of significant material reductions, for example in the region of a corrugated slot flange—it is self-evident that a similar situation applies for other, in particular mechanical, connection types such as for example screw connections—the required pressing forces for material reduction or mechanical connecting forces increase to a surprisingly great extent, such that, during production, the forces to be applied are comparatively high, and/or in the worst case, a secure connection of a tank cover to the base is no longer ensured. This fundamentally leads to comparatively uneconomical production. Recognizing this, the concept of the invention proposes that a base be composed of a first base part and a second base part. A first base part is preferably designed to form a region for passage openings of flow ducts. In addition, or alternatively, a second base part is preferably designed for connecting the tank cover. This has the advantage that the region for passage openings, formed for example as tube rim holes, can be designed independently of a region of a tank cover connection, and can therefore be used for different heat exchanger designs, for example for different indirect charge-air coolers. The second base part, for example the outer region of the base, may then—in accordance with a wide variety of designs and material thicknesses for the respective application—be preferably Tox clinched onto the first base part, for example the inner region of the base. It is thus for example possible for different materials and material thicknesses to be combined without problems.

Furthermore, this provides the advantage that add-on parts can be integrated in the air tank in a practically cost-neutral fashion and, in the case of complex air tank geometries, it is no longer necessary to use cast tanks—it is possible for plastic tanks to be used and advantageously expediently connected, preferably mechanically fixed, to the base or to the first and/or second base part according to requirements. Furthermore, the often-occurring potential risk in the case of single-piece bases of premature damage to the material, or of production-induced undesired material thinnings, is comparatively low. Said premature damage or material thinning can lead to a premature failure of the heat exchanger, or comparatively great material differences in a single-piece base cannot always be produced cost-effectively. In the concept proposed here of a two-part or multi-part base, said risk as a result of premature damage is reduced considerably, since the base production is considerably simpler and can also be carried out in a cost-neutral fashion. It is thereby possible to combine even large differences in material—be it the type of material requirement or a thickness of the material or other parameters—and is thereby possible to obtain inter alia installation space advantages.

It has proven to be particularly preferable that—as explained by way of example—the first base part and the second base part are mechanically fixed to one another. Furthermore, it has proven to be particularly advantageous within the context of one particularly preferred refinement for a tank cover to be fixed to the base by means of one or more mechanical connections. As particularly preferred refinements, it is possible to realize a mechanical connection as a screw connection, which is referred to below as a first variant. Furthermore, a mechanical connection in the form of a slot flange, referred to as a second variant, is also suitable individually or in combination. The concept according to the invention has proven to be particularly advantageous for the case that the tank cover and the base, or in individual cases also base parts, are composed of different materials.

In the above-specified refinement, the invention is based on the consideration that a connection of a tank cover, composed in particular of a non-metallic material, for example a plastic, fiber composite material or a ceramic, should be comparatively secure, and should also be sufficiently flexible with regard to thermal relative movements of the base, which is composed preferably of metal, for example aluminum, and of the tank cover. The refinement has recognized that in particular a screw connection or a slot flange or a combination of a screw connection with a slot flange is significantly more suitable for this purpose than known connection types. A connecting type according to the concept of the refinement therefore permits a particularly cost-effective connection of a tank cover, for example composed of metal, but in particular of a non-metallic material, to an otherwise metallic design of heat exchanger, thereby permitting in particular also more complex tank shapes while avoiding complex production processes.

A heat exchanger of the type specified in the introduction may be formed in particular as a charge-air heat exchanger in which the first fluid is charge air, or as an exhaust-gas heat exchanger in which the first fluid is an exhaust-gas. The first fluid may also be an exhaust-gas/charge-air mixture or similar fluid for charging an internal combustion engine. The second fluid, in particular a coolant, is for example a water-based coolant or some other expedient coolant.

One particularly preferred refinement of the invention has proven to be a heat exchanger in the form of a charge-air heat exchanger, in particular a charge-air cooler, which has the features according to the concept of the invention. The above-listed problems have resulted specifically in particular in air tanks, with indirect charge-air cooling having become increasingly established in the front of the vehicle on account of installation space restrictions in said region. In this connection, one refinement leads in a particularly preferred way to the use of the heat exchanger according to the concept of the invention as a charge-air cooler for the indirect cooling of charge air in a charge-air system for an internal combustion engine of a motor vehicle.

Furthermore, the concept according to the invention can also be realized in a heat exchanger as described in the pending, not yet laid-open German patent application from the applicant with the file reference 04-B-102 C. Said document specifies a heat exchanger of the type specified in the introduction in which a base has at least one first groove into which the tank cover or a wall section of the tank cover of the tank extends. Here, a tank is to be understood to mean in particular the tank cover, a seal and if appropriate the base. The documents of said application are hereby incorporated by this reference into the content of disclosure of this application. It has been found that the connection concept of a screw connection and/or of a slot flange between the tank cover and base can be particularly advantageously realized in the heat exchanger described in the cited application.

Further advantages of the concept of the invention emerge from advantageous refinements of the invention which can be gathered from the subclaims.

As already mentioned above, the first base part is preferably formed as an inner base part and the second base part as an outer base part, with the inner base part being surrounded at the periphery by the outer base part. In this way, it is particularly preferably possible for the first base part to be designed to form passage openings for flow ducts and for the second base part to be designed for preferably mechanically fixing a tank cover to the base.

The first base part may fundamentally be formed in the manner of one or more base plates which have the one or more passage openings. It is thus for example possible for the base plate to also be realized merely in the form of a frame which has a single passage opening. The base plate may also have a plurality of passage openings, for example, in a preferred first modification, passage openings arranged in one row. In a second modification, passage openings arranged in two rows may also be preferable. In principle, passage openings formed in more than two rows are also possible. The region of the passage openings is preferably formed with a greater wall thickness than a base plate edge region. In this regard, it has proven to be advantageous for the first base part, in particular the base plate, to have a podium which is elevated above a base plate edge region and which preferably has one or more passage openings.

A passage opening is preferably formed in the manner of a passage opening which holds a flat tube, and is in particular formed so as to be substantially rectangular.

In one particularly preferred embodiment, the second base part may be formed in the manner of one or more frame parts. A base frame part has proven to be particularly suitable for forming a second base part for fixing, for example mechanically locking, a tank cover, for example by means of a slot flange and/or a screw connection. In this regard, in one particularly preferred embodiment, the second base part, in particular a base frame part, may be substantially L-shaped in a cross section.

A limb, which lies practically in a plane of the base plate, of the L-shaped cross section can have at least one bead. A bead of said type has proven to be particularly suitable for holding an end edge of a wall part of a tank cover. In a further preferred embodiment, it is also possible for two beads, in particular beads formed on different sides, to be provided on the base frame part. The other bead formed in addition to the above-mentioned bead preferably serves to hold a wall region of a housing part, in other words to hold a housing edge.

A limb, which lies transversely with respect to the plane of the base plate, of the L-shaped cross section preferably has at least one slot which permits the formation of a slot flange. Particularly suitable in this regard are slots which are spaced apart from one another running around the entire periphery, which slots are for example punched. In one modification, slots of said type may in principle also be provided in a second base part with an L-shaped cross section.

The first base part and the second base part may fundamentally have different materials or else the same materials. It is particularly preferably provided that the first base part and the second base part have different material parameters, in particular different material thicknesses. The concept of the invention has recognized—as explained above—that different material thicknesses are preferable for the fixing of the flow ducts in passage openings of the first base part and for the connection of the tank cover or in particular for the locking of a tank cover by means of the second base part. Said advantage is realized particularly effectively following the concept of the invention according to the present refinement.

The first and the second base parts may be fixed to one another by means of one or more cohesive connections. Soldered or welded connections, for example, are particularly suitable. In one particularly preferred refinement, however, it is provided that the first and second base parts are fixed to one another by means of one or more mechanical, in particular form-fitting connections. In one very particularly preferred refinement, the base parts are Tox clinched to one another. It has surprisingly been found that such mechanical connection types or other simple mechanical connection types nevertheless fix the base parts to one another in a sufficiently secure manner.

Furthermore, the tank cover can be fixed to the base by means of one or more cohesive connections—soldered or welded connections are particularly suitable here too. Furthermore, however, it has proven to be particularly preferable for the tank cover to be fixed to the base by means of one or more mechanical, in particular form-fitting, connections—particularly preferably—as already explained above—as one or more screw connections and/or slot flanges.

The base is advantageously composed of a metal, in particular of aluminum. This permits sufficient thermal stability and also an advantageous attachment of the flow ducts into the passage openings of the base.

In order to ensure a further improved sealed connection of the tank cover, one particularly preferred refinement provides that a seal is fixed between the base and the tank cover.

It is particularly advantageously provided that the base and/or the tank cover has a bead which is advantageously designed to hold the seal. In particular, the bead is arranged in a base edge region and/or in a tank cover edge region.

Within the context of the above-specified refinements, it has proven to be particularly effective for sealing the tank if an end side of the tank cover or a wall section of the tank cover and/or of the base extends along the bead.

The above-specified refinements are particularly suitable, preferably in order to improve a sealing behavior, to fix the base and the tank cover relative to one another—in a bead. One or more beads may optionally be arranged on the tank cover. An end side of the base then advantageously extends along the bead. One or more beads are preferably arranged on the base, and an end side of the tank cover advantageously extends along the bead. In other words, in one particularly advantageous delimitation from the prior art, one or more beads are utilized to obtain improved and more sealing fixing of the base and tank cover relative to one another.

According to one particularly improved first modification, it is provided that the tank cover or a wall section of the tank cover and/or of the base makes contact, in an abutting fashion, by means of an end side against the base, in particular in such a way that the end side engages over the bead. In other words, the width of the end side is greater than the width of the bead.

The first modification of the invention specified above has proven, in particular with respect to a screw connection, to be particularly effective, in particular with regard to its sealing behavior, but is not restricted thereto. The screw connection may fundamentally be realized in a variety of ways. One refinement of the invention provides a particularly reliable design of the screw connection. Within the context of the concept of the invention, a refinement has proven to be particularly advantageous in which the base has a number of eyes for holding in each case one screw connection. An eye may be arranged in particular at a corner and/or on a side of the base. The attachment of eight eyes—in each case one at each corner and on each side of the base—has proven to be particularly effective. It is very generally possible for two adjacent eyes to have a spacing which lies in the range between 40 and 90 mm, preferably between 50 and 70 mm. The number of eyes is fundamentally dependent on the dimensions of the base. The stated spacing ranges have proven to be particularly advantageous for preferred base dimensions, and form an expedient compromise between stability and material expenditure.

The production process can be simplified if a lock nut is provided on the base or on the tank to form the screw connection.

According to one particularly preferred second modification, it is provided that an end side of the cover or of a wall section of the cover and/or of the base engages into a bead. The second modification has proven to be particularly effective within the context of a slot flange, preferably for a corrugated slot flange, but is not restricted thereto. In this way, it is possible to realize a particularly advantageous sealing action, and the slot flange can be used in a particularly space-saving manner. The slot flange is advantageously designed as a corrugated slot flange, since this has proven to be reliable and falls within the scope of previous production concepts.

In one particularly preferred refinement of the invention, the possibility for a material saving has been created in that a base thickness advantageously decreases in the radially outward direction across a bead. The base thickness at least at the bead base is preferably smaller than at a point of the base which is situated further inward along the radius. The abrasion forces for the slot flange or corrugated slot flange are correspondingly smaller, on account of the reduced material thickness, than in other designs. One particularly advantageous compromise between the material expenditure and stability is provided if the ratio of a greatest base thickness to a smallest base thickness is in the range between 2:1 and 4:1.

The base is preferably fixed to the housing, for example by means of a cohesive or mechanical connection, or by means of some other connection, suitable for the fastening of the base, of the base to the housing. In particular, the base holds the flow ducts in the one or more passage openings. This ensures sufficient retention of the flow ducts on the base, and the block is arranged in the housing in a particularly advantageous manner.

The housing preferably has side walls which extend along a flow direction, and is formed in a plurality of parts. This permits particularly simple assembly of the block in the housing and of the heat exchanger overall. It has been found to be particularly advantageous according to the refinement that at least one housing part forms a housing edge, that is to say is integrally formed. In this way, it is possible to avoid leaks as a result of connecting points of housing parts at a housing edge, and the assembly of the housing is made considerably simpler. At least one housing part, at least in regions, preferably integrally forms a first and a second side wall which are aligned at an angle with respect to one another. This has the advantage that, in contrast to the prior art, housing side walls need no longer be provided separately, but rather are provided integrally in a single housing part. In particular, this reduces the number of housing parts.

It is preferable, according to a first modification, for at least one housing part to be of U-shaped design, for example so as to provide a cover wall and at least a part of a first side wall and at least a part of a second side wall of the housing. The housing is preferably formed from two U-shaped housing parts. The two housing parts are preferably correspondingly formed, such that an entire housing casing can be formed in a simple manner by means of said housing parts. It can be advantageous in particular for the two U-shaped housing parts to be symmetrical or practically identical, which considerably simplifies the production process. To form a housing casing, and in particular in the case of U-shaped housing parts, a parting edge of housing parts is preferably arranged in the region of a side wall.

In a second modification, it has proven to be advantageous for at least one housing part to be of L-shaped design, for example as cover wall and side wall, which are formed with the single-piece housing part, of the housing. The housing can be formed overall from two L-shaped housing parts. In particular, the two L-shaped housing parts are correspondingly formed or largely symmetrical or identical, which considerably reduces the production expenditure. Preferably within the context of the second modification, it has proven to be advantageous to arrange a parting edge of housing parts in the region of a housing edge.

Within the context of one preferred refinement of the invention, the block has a first arrangement and a second arrangement of flow ducts, with the first arrangement and the second arrangement being arranged on opposite sides of an intermediate base. The integrity and stability of the heat exchanger is considerably improved in this way, and it is nevertheless possible to provide a comparatively large flow cross section for the first fluid, for example an exhaust gas or charge air.

An intermediate base may be arranged parallel to and/or substantially in a plane spanned by the parting edges of housing parts. This has proven to be advantageous in particular in the case of U-shaped housing parts, in which a parting edge is arranged in the region of a side wall. This advantageously permits the arrangement of an intermediate base practically centrally and parallel to the side walls and in the plane spanned by the parting edges of the U-shaped housing parts.

It is fundamentally advantageous within the context of the above-specified refinement that opposite parting edges of the housing parts form a gap, in particular with a gap width of 1 mm to 2 mm. The selection of the gap width is important in particular during the soldering of the components, in particular for the formation of the solder meniscus, since adequate soldering is not ensured if the gap is too large or if the gap is too small.

According to a preferred first modification of said refinement, an intermediate base can engage into a gap formed by opposite parting edges of the housing parts. This stabilizes the multi-part housing in connection with the block. Furthermore, it is particularly preferably possible to utilize the intermediate base which is situated in the gap to seal the housing parts with respect to one another. In a preferred second modification of said refinement, a web can cover parting edges of the housing part, and can in particular be arranged at the outside on the housing. The measures provided in addition or alternatively to the first modification can likewise be utilized to stabilize the multi-part housing. A web may preferably have a bead, in particular a bead which is designed additionally for stiffening. It is particularly preferable in a refinement of said second modification for a bead of the web to be designed so as to engage into a gap formed by opposite parting edges of the housing parts.

In one advantageous refinement of the invention, at least two components of the heat exchanger are soldered to one another.

In one advantageous refinement of the invention, all of the components of the heat exchanger with the exception of the at least one tank cover, in particular the two tank covers, are soldered to one another.

Overall, according to the above-specified refinements relating to the housing, a particularly stable housing is provided which can be assembled using comparatively few parts. The above-explained measures for the design and arrangement of the parting edges of the housing parts additionally lead to a particularly preferable further stabilization or reinforcement of the multi-part housing.

While the invention has proven to be particularly expedient within the context of a use of the heat exchanger in the form of a charge-air heat exchanger, in particular charge-air cooler, for example for the indirect or for the direct cooling of charge air in a charge-air system for an internal combustion engine of a motor vehicle, and is to be understood in this sense, and while the invention is described in detail below on the basis of examples from this field, it should nevertheless be clear that the concept described here and as claimed is likewise expedient within the context of other applications which lie outside the examples explicitly stated and other applications which are not explicitly specified. For example, the proposed concept of the invention is likewise suitable for the use of a heat exchanger as an exhaust-gas heat exchanger, in particular exhaust-gas cooler, for example for exhaust-gas cooling in an exhaust-gas recirculation system of an internal combustion engine of a motor vehicle or as an auxiliary heater for heating the interior space of a motor vehicle. Also possible is a use as an oil cooler, in particular for cooling engine oil and/or transmission oil, or a use as a refrigerant cooler or refrigerant condenser in a refrigerant circuit of an air-conditioning system of a motor vehicle. In this connection, the invention also encompasses an exhaust-gas recirculation system for an internal combustion engine, having an exhaust-gas recirculation line, a compressor and a heat exchanger in the form of an exhaust-gas heat exchanger, in particular cooler, according to the concept of the invention. The invention also encompasses a charge-air supply system for an internal combustion engine, having a charge-air intake line, an air filter, a compressor and a heat exchanger according to the concept of the invention in the form of a charge-air heat exchanger, in particular cooler.

Exemplary embodiments of the invention are now explained below on the basis of the drawing. Said drawing is intended to illustrate the exemplary embodiments not necessarily to scale; the drawing is in fact shown in schematized and/or slightly distorted form where appropriate for explanation. With regard to enhancements of the teaching which can be directly gathered from the drawing, reference is made to the relevant prior art.

Here, it is to be taken into consideration that various modifications and changes relating to the shape and details of an embodiment may be carried out without departing from the general idea of the invention. The features of the invention disclosed in the above description, in the drawing and in the claims can be essential both individually and also in combination for the refinement of the invention. The general idea of the invention is not restricted to the precise shape or the detail of the preferred embodiment shown and described below, or restricted to a subject matter which would be restricted in relation to the subject matter claimed in the claims. Where dimensional ranges are specified, values which fall within the specified limits are also intended to be disclosed as limit values and usable and claimable in any desired manner. The drawing shows, in detail, different embodiments according to the concept of the invention, with a realization of the block of the heat exchanger in detail as described in the above-specified German patent application from the applicant having proven to be advantageous.

Further objects, features and advantages of the present invention will become apparent from the detailed description of preferred embodiments that follows, when considered together with the accompanying figures of drawing.

BRIEF DESCRIPTION OF THE DRAWINGS

In detail, in the drawing:

FIG. 7 shows a particularly preferred embodiment according to the second variant;

FIG. 8 shows an enlarged perspective partially sectioned illustration of the embodiment from FIG. 7;

DETAILED DESCRIPTION OF THE PREFERRED EMBODIMENTS

Below, the same reference symbols are used for identical or functionally equivalent parts.

Figure 1A:
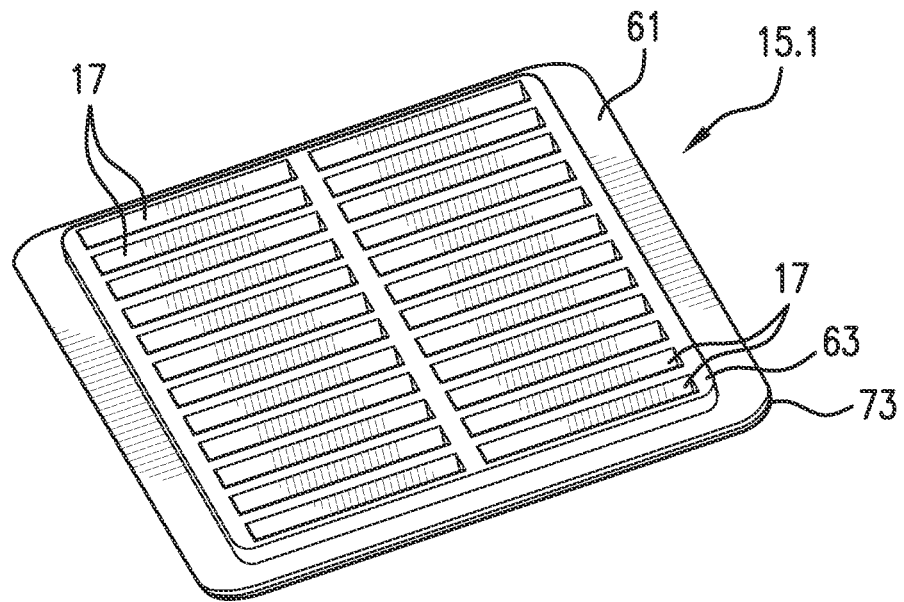
FIG. 1A shows a first base part in the form of a base plate for forming a base, in one particularly preferred embodiment of a heat exchanger according to the second variant.
Figure 1B:
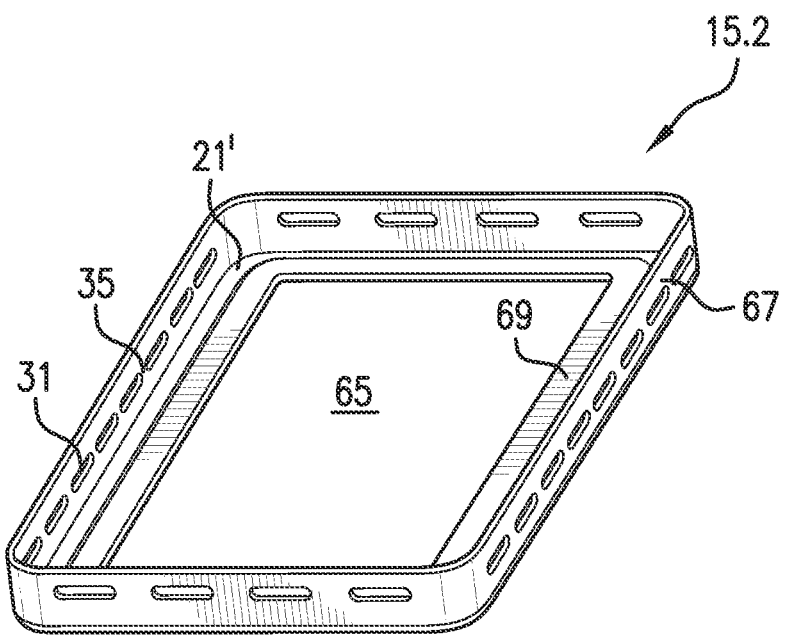
FIG. 1B shows a second base plate in the form of a base frame part for forming a base, in one particularly preferred embodiment of a heat exchanger according to the second variant.

FIG. 1 shows, in view A, a first base part 15.1 which is formed as an inner base part in the form of a base plate with a plurality of passage openings 17 for flow ducts 5. Here, the passage openings 17 are in the present case arranged in two rows and are formed by a podium which is elevated above a base plate edge region 61, specifically as a relatively thick inner base region 63 which is formed within the base plate edge region 61. Here, a passage opening 17 is of substantially rectangular design in order to be able to hold a flow duct 5 in the form of a flat tube.

The second base part 15.2 shown in view B in FIG. 1 is formed as an outer base part in the form of a single base frame part, and in the present case, has an L-shaped cross section. The free area 65 of the base frame part corresponds substantially to the area of the podium 63, and can thus hold the passage openings 17, which are guided through the podium 63, with inserted flow ducts 5.

In the present case, that limb 67 of the L-shaped cross section which lies transversely with respect to the plane of the base plate has slots 31 which are spaced apart from one another running around the entire periphery, which slots 31 are punched so as to form a slot flange, explained with reference to FIG. 7 to FIG. 12, into the limb 67. Situated between the slots 31 is material 35 of the limb 67, which material 35 is utilized to form the slot flange.

The other limb 69, which lies in the plane of the base plate, of the L-shaped cross section can, in a first modification, serve, at its underside (not visible in view B of FIG. 1), as a contact surface for the base plate edge region 61. The inner region 63 of the base plate is then formed in a closely-fitting manner with respect to the opening 65 of the base frame part. The outer edge of the base plate edge region 61 then adjoins a border, which merges into a bead between the limb 69 and the limb 67, of the limb 69. In this way, the base plate—as it is inserted from below in the first modification—is fixed into the base frame part in a closely fitting manner even against lateral displacement.

Figure 2B:
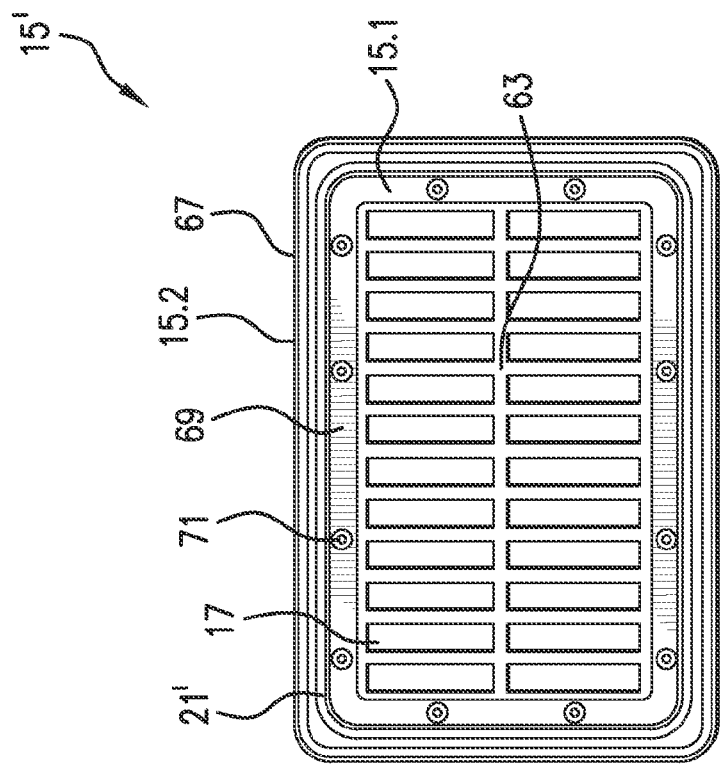
FIG. 2B shows the base formed by the base plate and the base frame of FIG. 1, as an external plan view.
Figure 2A:
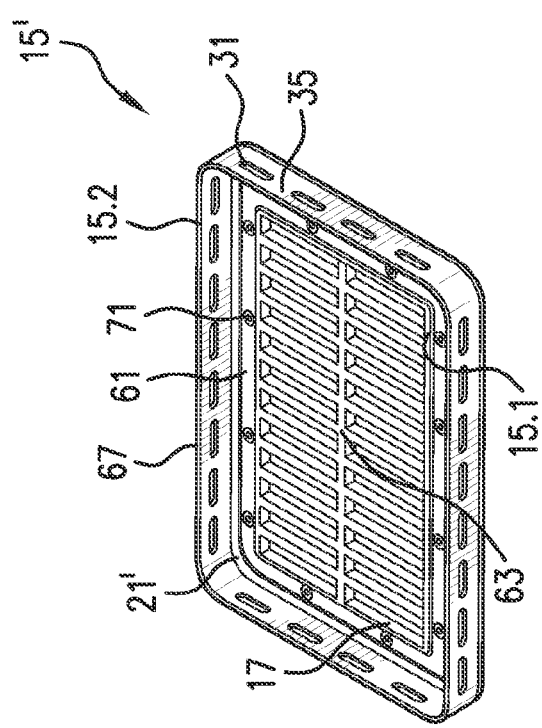
FIG. 2A shows the base formed by the base plate and the base frame of FIG. 1, in a perspective view.

FIG. 2 shows—in a perspective view in view A and as a plan view in view B—a base 15', as will be explained in more detail with reference to FIG. 7 to FIG. 12, firstly for connecting a tank cover of a heat exchanger 20 and secondly for holding a plurality of passage openings 17 for the flow ducts 5.

In the present case, the first base part 15.1 and the second base part 15.2 are fixed to one another by means of a plurality of Tox clinched points 71. It should be understood that several further relative arrangements of the first base part 15.1 and second base part 15.2 are possible over and above the first modification, and furthermore, other form-fitting or cohesive connections which are not shown here for fixing the first base part 15.1 and second base part 15.2 to one another may be expedient according to requirement and expenditure. A Tox clinched connection with a plurality of Tox clinched points 71 has proven to be particularly preferable in the present case. Here, it is possible in particular—as explained here on the basis of a second modification—for a base plate to lie with its base plate edge region 61 on the limb 69 of the base frame part—that is to say, the base plate can be placed into the base frame part. This has the advantage that the limb 69 may also be of rectilinear design, and a bead 21' is nevertheless formed between the limb 67 and the base plate—specifically by the upright edge 73 of the base plate. The first base part 15.1 and the second base part 15.2 may be fixed to one another by means of Tox clinching in this case too. Furthermore, in the second modification illustrated here, there is the advantage that the base part 15.1 can serve to support the tank cover 11'. Furthermore, the base edge part may be formed with a bead 21' or else so as to be flat in the limb 69. During the formation of the slot flange with the limb 67, the latter is then additionally pressed onto the base plate region 61, such that the base plate can, in a manner shown in FIG. 7 to FIG. 12, be fixed by means of an upright end side 25' of a wall region 28 of a tank cover 11' to the base plate edge region 61 and to the slot flange.

Overall, said type of base 15' which is composed, as per FIG. 1 and FIG. 2, of a first base part 15.1 and a second base part 15.2, results in the advantage that the second base part 15.2, which is formed as a base edge part, can be produced effectively and also with a (practically arbitrary) material thickness which is advantageous for the slot flange. The second base part may be produced with the above-mentioned bead 21' or else without the latter—in which case a deep-drawing process is dispensed with. A bead-like groove, which can be utilized for the placement of a seal or the like, is nevertheless generated as a result of the upright edge 73. Also generated is a small projecting length of the base, which can be produced comparatively effectively, with comparatively good support for a tank cover 11. The two-part design therefore enables stable tank support. Furthermore, the first base part 15.1, which is formed as a base plate, can be produced in a particularly simple and reliable fashion. It has been found that the Tox clinching process has, in a particularly positively surprising manner, proven to be non-critical in process terms for the assembly of the first and second base part 15.1, 15.2, and the costs in the case of a two-part design as per FIG. 1 and FIG. 2 are neutral in relation to a likewise possible single-part design—such as is explained for example in the filed but not yet laid-open application under the applicant's file reference 06-B-239-A.

Without returning to the detail of the two-part design of the base 15', a base according to the two-part design in FIG. 1 and FIG. 2 is used in the embodiments of a base shown in FIG. 7 to FIG. 12.

It should nevertheless be noted that even a base which is not provided with a slot flange—for example a base 15 formed with a screw connection, as per FIG. 3 to FIG. 6—can be formed, as a base not shown here yet composed similarly in principle, with a first base part—even identical to the base part 15.1—and a second base part correspondingly modified in relation to the base part 15.2 for the screw connection. In such a case, too, the first base part 15.1, which is formed as a base plate, can if appropriate be placed in a closely-fitting manner into a frame-like second base part 15.2, with an L-shaped cross section, wherein eyes for connecting a tank cover 11 can be provided on the second base part 15.2—as can be seen from FIG. 3 to FIG. 6—instead of the slots 31.

Figure 3:
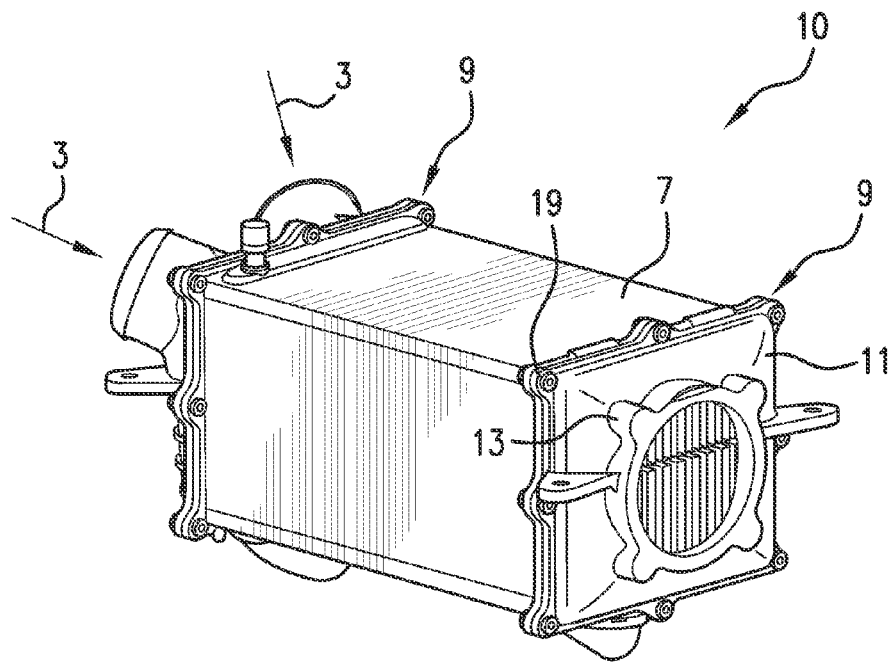
FIG. 3 shows one particularly preferred embodiment of a heat exchanger according to the first variant.

FIG. 3 shows a heat exchanger 10 in the form of a charge-air cooler for indirect charge-air cooling, which charge-air cooler can be used in a charge-air system for an internal combustion engine. A charge-air system (not illustrated in any more detail) also has a charge-air intake line, an air filter and a compressor. The heat exchanger 10 represents a particularly preferred embodiment of the first variant, according to which a tank cover 11 is fixed to a base 15 by means of a plurality of screw connections 19.

Figure 4:
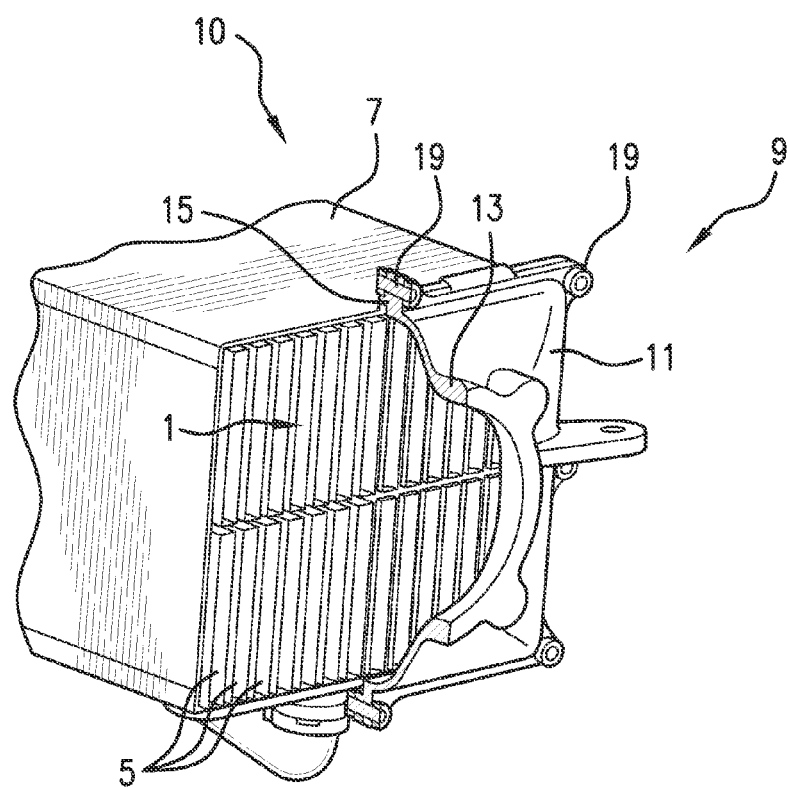
FIG. 4 shows an enlarged perspective partially sectioned illustration of the base region of the embodiment of FIG. 3.

As can be seen by viewing FIG. 3 and FIG. 4 together, the heat exchanger 10 has a block 1 which is provided for the separate and heat-exchanging guidance of a first fluid in the form of charge air 3 and also of a coolant (not illustrated in any more detail). For this purpose, the block 1 has a number of flow ducts 5 which can be traversed by the charge air 3, and a housing which holds the flow ducts 5 and which can be traversed by the coolant. In the present case, the charge-air cooler 10 has two tanks 9, 9', of which the front tank 9 is illustrated in more detail in FIG. 4 to FIG. 6. The two tanks 9, 9' are flow-connected to the flow ducts 5 and have tank cover 11, 11' which is designed differently in detail corresponding to the connections for the charge air 3. In this embodiment, the two tank covers 11, 11' are formed from plastic, with the front cover 11 with a single integrally formed diffuser arrangement 13 for the charge-air connection being illustrated in more detail. A two-part base 15—similar to that of FIG. 1 and FIG. 2—is fixed to the cover 11, which two-part base 15 has passage openings 17 which are clearly illustrated in FIG. 5 and flow ducts 5 which are assigned to said passage openings 17.

In a modified embodiment, the heat exchanger may also be embodied as a heat exchanger which is traversed, correspondingly, by exhaust gas instead of charge air 3.

Figure 5:
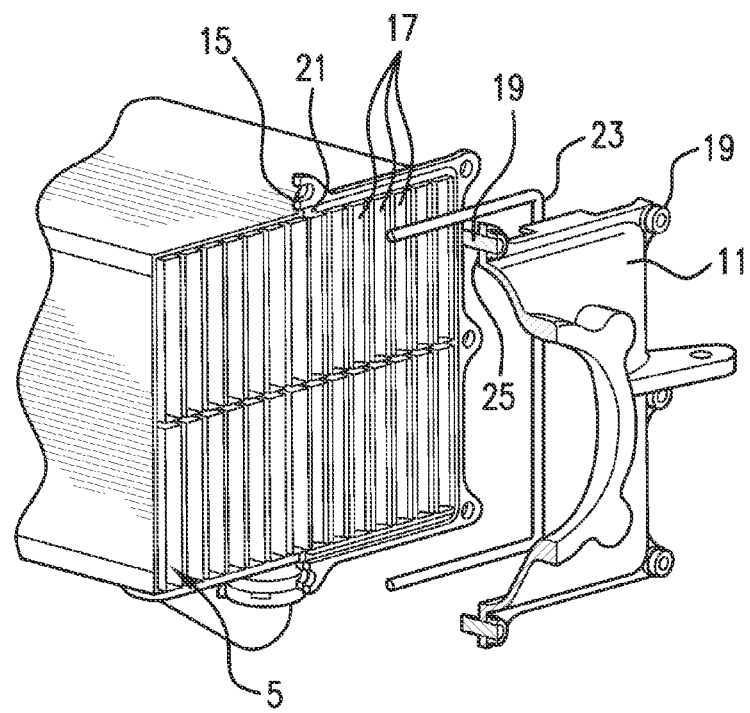
FIG. 5 shows an exploded illustration of FIG. 4.
Figure 6:
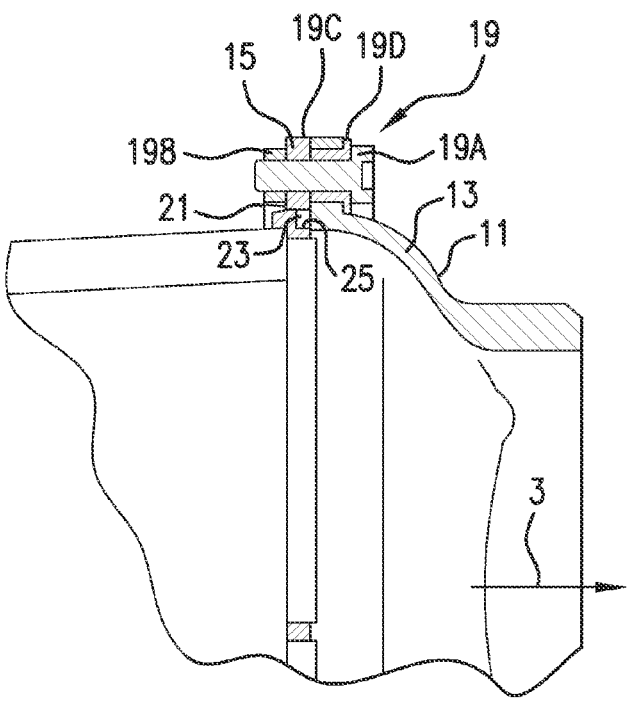
FIG. 6 shows a sectioned illustration of the detail of a screw connection in the embodiment as per FIG. 3 to FIG. 5.
Figure 9:
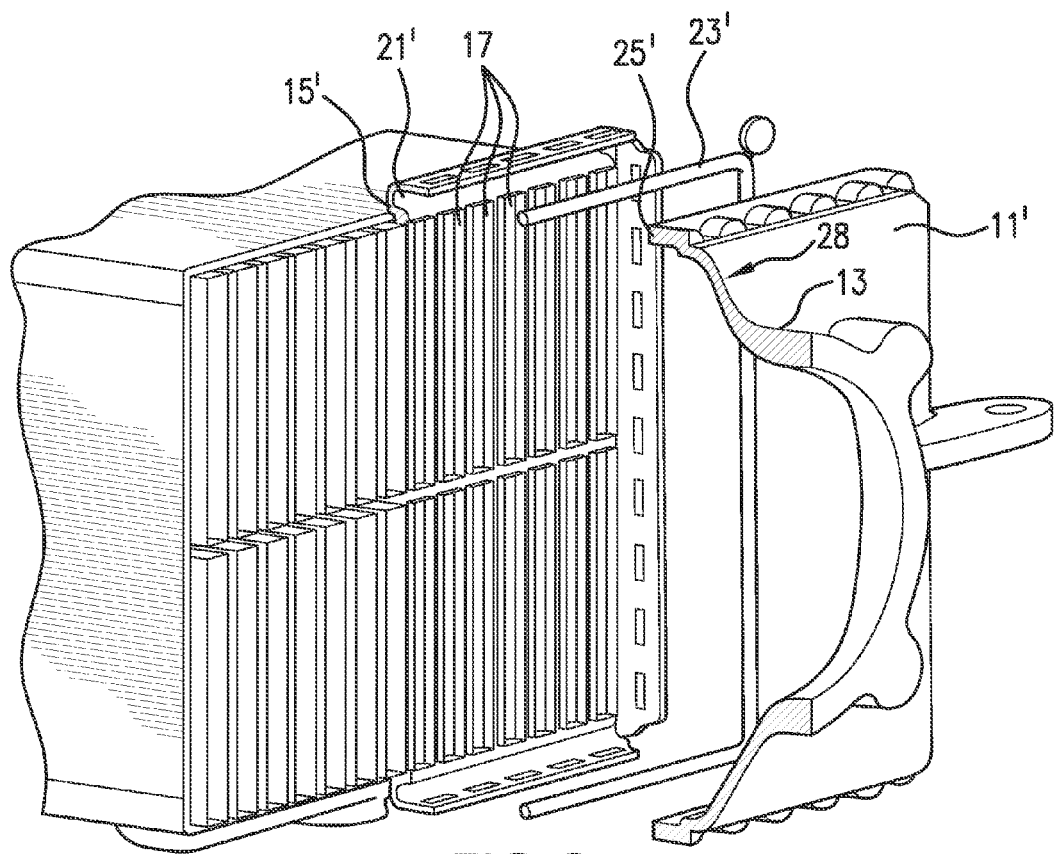
FIG. 9 shows an exploded illustration of FIG. 8.
Figure 10:
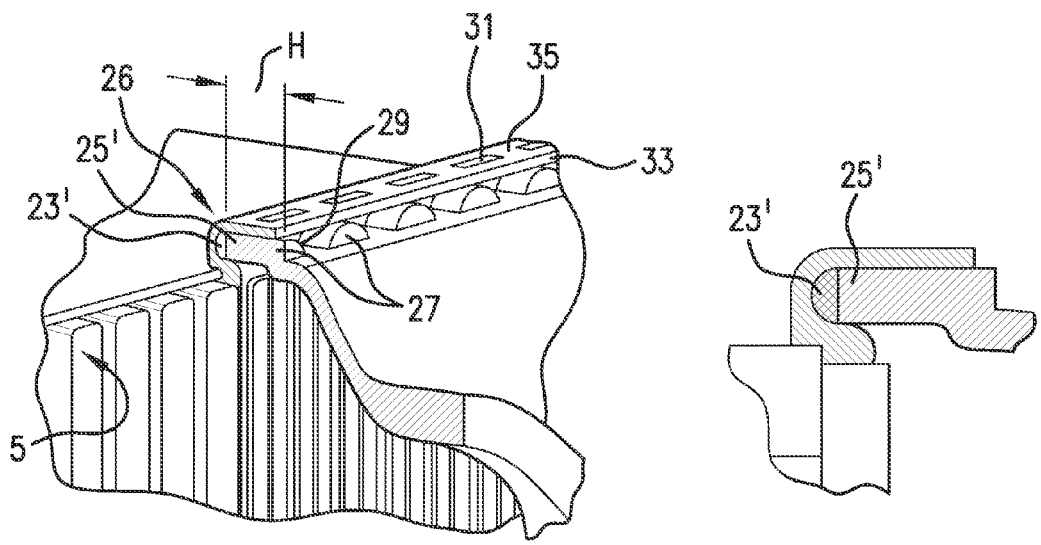
FIG. 10 shows a perspective partially sectioned illustration of the detail of a corrugated slot flange in FIG. 8.
Figure 11:
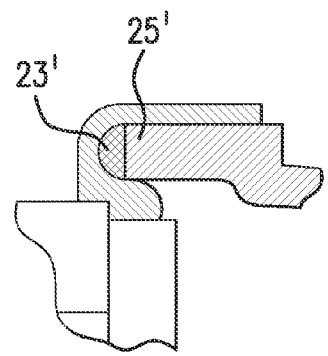
FIG. 11 and FIG. 12 show a sectioned illustration of the detail of the corrugated slot flange of the embodiment in FIG. 7 to FIG. 10.

In the embodiment illustrated in FIG. 3 to FIG. 6, according to the first variant of the invention, the tank cover 11, 11' is fixed by means of a plurality of screw connections 19, illustrated in more detail in FIG. 6, to the base 15. Here, the base 15 has a bead 21 which, in the present case, runs all the way around the base 15, in which bead 21 is held a seal 23, in the present case in the form of an annular seal.

As can be seen from FIG. 6 viewed together with FIG. 3 to FIG. 5, the end side 25 of the tank cover 11, 11' extends along the bead 21 and, here, makes contact in an abutting fashion with the base 15, with the end side 25 engaging over the bead 21. In this way, the seal 23 is pressed by means of the end side 25 into the bead 21, so as to generate very effective sealing between the base 15 and the tank cover 11. The screw connections 19 are in the present case formed in each case by a screw 19A and a lock nut 19B which is held in a screw eye 19C. As is clearly shown in FIG. 3 to FIG. 5, in each case one screw eye 19C is arranged in each case at one corner or at the centre of a side of the base 15. The screw connection is also secured by means of an annular flange 19D between the lock nut 19B and the screw 19A. The screw connection 19 serves to exert a contact pressure between the tank cover 11 and the base 15 on the seal 23, which seal 23 expands in the bead 21 on account of the contact pressure and provides effective sealing between the tank cover 11 and the base 15.

The screw connections 19C are spaced apart uniformly with respect to one another; in the present case, the spacing should be approximately 50 to 80 mm. For screwing on, lock nuts 19B are arranged either on that side of the base which faces toward the block 1 or on the tank 9, 9'. In the present case, the screw 19A is inserted through a tank foot in the form of a metal sleeve on the base 15, and is screwed to the nut 19B behind the base 15.

In the screw connection 19, the groove width in the base 15 is approximately 3 mm. The seal 23, which is 2 mm wide, is pressed into the bead 21. The bead 21, 21' is locally thickened at some points, in the present case every 30 mm, up to the bead dimension in order to position the seal 23.

FIG. 7 shows a different charge-air cooler 20, likewise for indirect charge-air cooling as described in more detail above with reference to the charge-air cooler 10, in which, in the present case, according to one preferred embodiment of the second variant, the tank cover 11 on the second base 15' is fixed—identically to FIG. 1 and FIG. 2—by means of a slot flange connection 26 as a corrugated slot flange. Identical reference symbols have been used for corresponding parts of the charge-air coolers 10 and 20.

In contrast to the embodiment described with reference to FIG. 3 to FIG. 6, in the embodiment of a charge-air cooler 20 shown here, the tank cover 11' is fixed to the base 15' by means of a corrugated slot flange 26. For this purpose, a seal 23' is placed into the bead 21' which is formed in the present corrugated slot flange 26, which seal 23', after the tank cover 11' is placed on, is pressed into the bead 21' in a sealing fashion by means of the end side 25', which engages into the bead 21', of the tank cover 11'. Particularly advantageous sealing of the tank 9, 9' is obtained in this way. The wall section 28, which forms the end side 25' of the tank cover 11', of the tank cover 11' merges at one end into the above-described air connection, which is embodied as a diffuser 13, and at the other end, the wall section 28 has, along a height H of the bead 21', ribs 27 which are semi-cylindrical in shape and which are arranged with a spacing 29. Situated opposite the ribs 27 is in each case one slot 31 of a flank 33 which is situated opposite the wall section 28. Situated opposite the spacing 29 is that material 35 of the flank 33 which is situated between the slots 31, said material being aluminum in the present case. Said material 35 can, during the closure of the slot flange 26, be pressed into the spacing 29 between the ribs 27 so as to form the corrugated slot flange. At least some of the components of the heat exchanger 10 are soldered, in particular Nocolok-soldered, to one another. In another exemplary embodiment, all the components of the heat exchanger 10 with the exception of the at least one tank cover, in particular the tank covers, are soldered, for example Nocolok-soldered, to one another.

Figure 12:
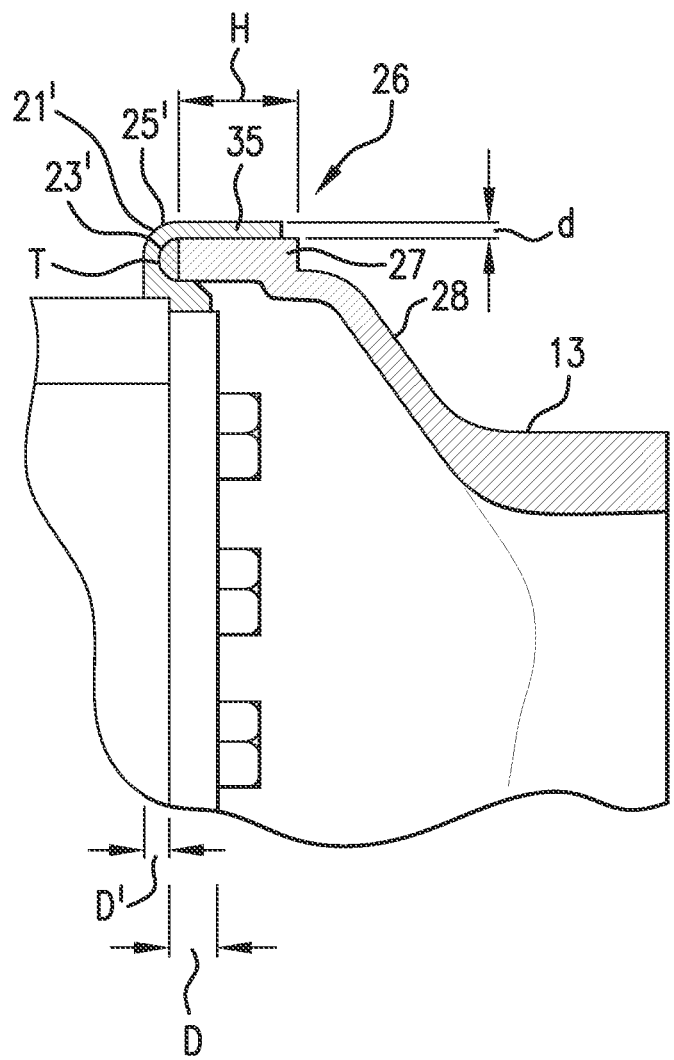

In the illustration shown in FIG. 12—applicable equally to a heat exchanger 10 and a heat exchanger 20—it is also illustrated that a base thickness decreases in the radially outward direction across the bead 21'—in the present case, from the greatest value D in the region of the openings 17 for the flow ducts 5, in the present case tubes, via a value D' in the region of the bead 21', to a smallest value d in the region of the outer flank 33 of the bead 21', the material 35 of which flank is flanged to form the corrugated slot flange 26. In the present case, the thickness of the base 15' varies from D=4 mm to d=1.5 mm, that is to say, overall, it is possible in embodiments of this type to reduce the base material by 50 to 70%. It has also been found that it is also possible for this purpose to form the thickness at the lowest point T of the bead 21' to be even in the range of the smallest value d. It is otherwise possible regardless of the embodiment described here for the transition from the large thickness D to the thin thickness d to be of any desired design.

The described design of the bead 21' has the advantage that the base 15' permits effective tube and flow duct soldering with a good bundling process in the region of the openings 17 with the large thickness D. In contrast, on account of the smallest value d of the small material thickness in the region of the corrugated slot flange 26, a particularly installation-space-saving concept which keeps abrasive forces low is obtained. For example, the material 35 to be flanged can be displaced during the course of a punching process. As a result of the material reduction in the region of the flank 33, the fastening of the tank 9, 9' can be designed with a considerably reduced installation space requirement. At least some of the components of the heat exchanger 10 are soldered, in particular Nocolok-soldered, to one another. In another exemplary embodiment, all the components of the heat exchanger 10 with the exception of the at least one tank cover, in particular the tank covers, are soldered, for example Nocolok-soldered, to one another.

The embodiments, explained on the basis of FIG. 13 to FIG. 18, of a heat exchanger in the form of a charge-air cooler 30, 40, 50 show advantageous examples of a design of a housing 7 as is generally shown in the above-described FIG. 3 to FIG. 12. The modifications of a housing 37, 47, 57 shown in FIG. 13 to FIG. 18 can if required be used for a housing 7 of FIG. 3 to FIG. 12. The embodiments of a heat exchanger 30, 40, 50 described in FIG. 13 to FIG. 18 are illustrated merely by way of example as embodiments according to the second variant of the invention, in which a tank cover of the heat exchanger 30, 40, 50 is fixed to the base as a slot flange. The statements made with regard to FIG. 13 to FIG. 18 can be applied equally to an embodiment (not shown) of a heat exchanger in which the tank cover is fixed to the base by means of a screw connection. Overall, the features (both individually and also in combination) disclosed in FIG. 3 to FIG. 12, in particular relating to the fixing of the tank cover to the base, can be combined, and used according to the application, with the features (individually or in combination) disclosed in FIG. 13 to FIG. 18, in particular relating to the design of a housing 37, 47, 57. In this respect, in the exemplary embodiments, the same reference symbols have been used for identical parts or functionally equivalent parts. At least some of the components of the heat exchanger are soldered, in particular Nocolok-soldered, to one another. In another embodiment, all the components of the heat exchanger with the exception of the at least one tank cover, in particular the tank covers, are soldered, for example Nocolok-soldered, to one another.

Figure 13:
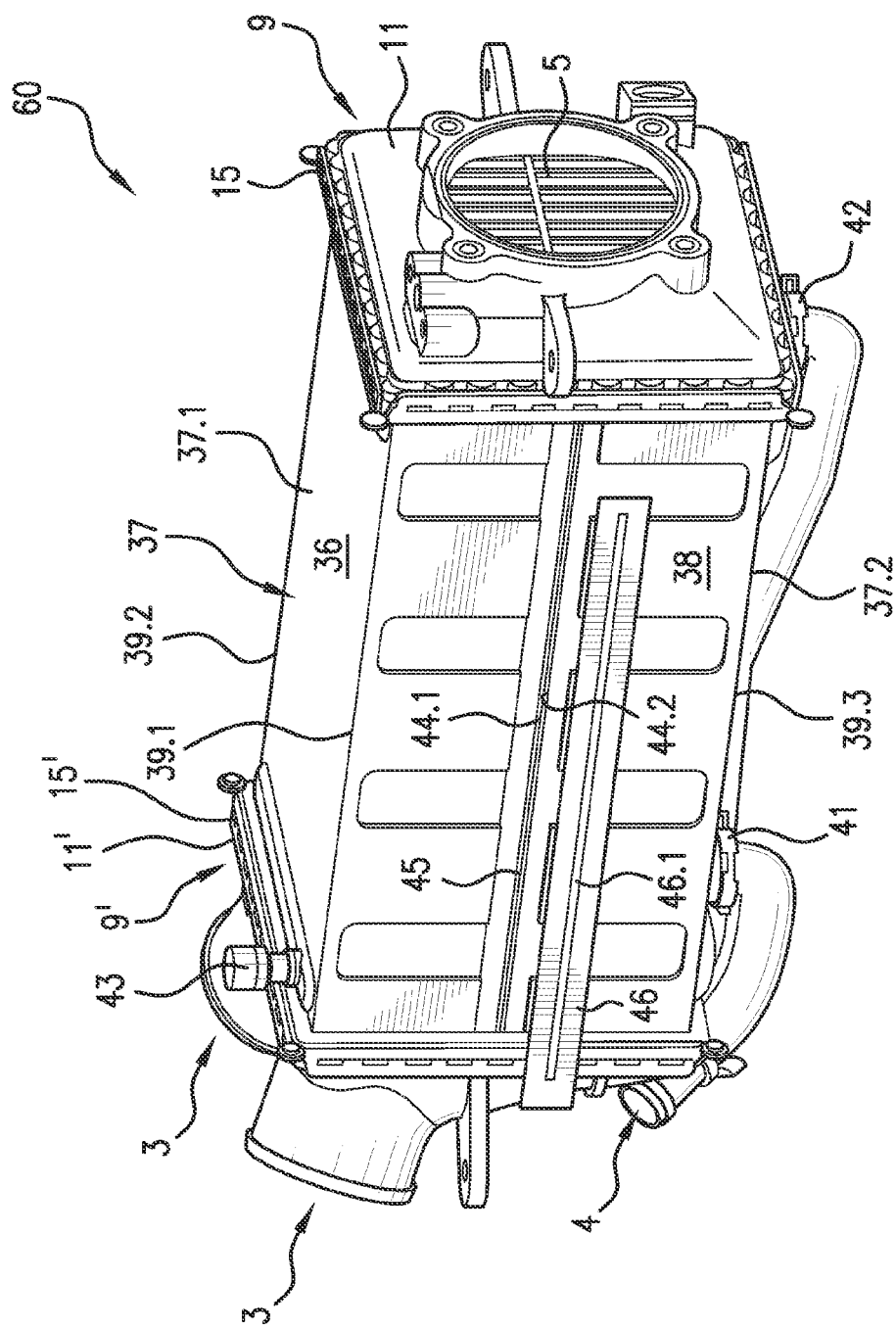
FIG. 13 shows a perspective illustration of a further preferred embodiment of a heat exchanger according to the first or second variant of the invention, in which, in a first modification, the housing is formed from two U-shaped housing parts and is reinforced by means of a web (shown in an exploded illustration) with a stiffening bead.

FIG. 13 shows a heat exchanger 30 in the form of a charge-air cooler as an embodiment according to the second variant of the invention, similar to the heat exchanger 20 described in FIG. 7. Said heat exchanger 30 again has a block 1 with a number of flow ducts 5 which are traversed by charge air 3 and which are hold in a housing 37 which can be traversed by the coolant. As is explained on the basis of FIG. 7 to FIG. 12, tanks 9, 9' are flow-connected to the flow ducts 5 and have a tank cover 11, 11' which is designed differently in detail corresponding to the connections for the charge air 3. Said tank covers 11, 11' are in each case fixed to the base 15, 15' in the way explained with regard to FIG. 7 to FIG. 12. The base 15, 15' is fixed to the housing, with the flow ducts 5 extending through passage openings 17 illustrated in more detail in FIG. 9.

Figure 14:
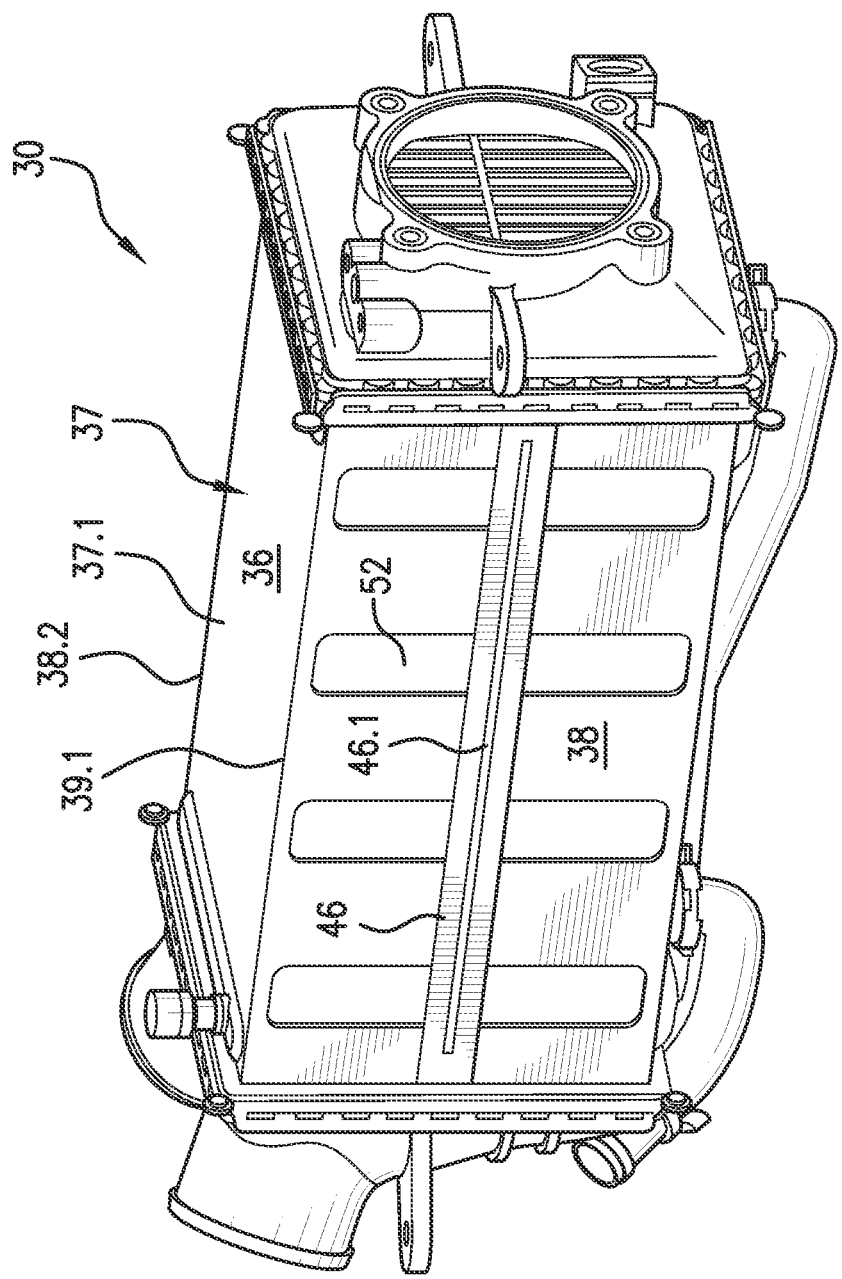
FIG. 14 shows a perspective illustration of the heat exchanger from FIG. 13.

The housing 37, which is illustrated in a perspective view in FIG. 14 and as an exploded illustration in FIG. 13, has two cover walls 36 and two side walls 38, with a cover wall 36 being aligned substantially at right angles to the side wall 38. An upper housing part 37.1, which is U-shaped in the present case, forms a first and a second upper housing edge 39.1, 39.2, while a second, lower housing part 37.2 forms a first, lower housing edge 39.3 and a second lower housing edge 39.4 (not illustrated). The upper housing 37.1 is formed correspondingly—with the exception of coolant connections 41, 42, 43—so as to be substantially identical to the lower housing part 37.2. Via the coolant connections 41, 42, 43, coolant 4 is, in a way not illustrated in any more detail, supplied to and discharged from the interior of the housing 37 in order to purge the flow ducts 5. In the present case, the entire housing casing of the housing 37 is formed by means of the upper housing part 37.1 and the lower housing part 37.2 The parting edges 44.1 and 44.2 of the upper housing part 37.1 and of the lower housing part 37.2 are in the present case arranged in the region of a side wall 38 of the housing 37 and are situated opposite one another so as to form a gap 45. For the sealing closure of the housing 37, the gap 45 is covered by a web 46, with a stiffening bead 46.1 of the web engaging into the gap 45. In addition to sealing closure of the housing 37, the attachment of the web 46 leads to the stability of the housing 37, which is already comparatively high as a result of the single-piece design of the upper housing part 37.1 and of the lower housing part 37.2, being improved yet further. At least some of the components of the heat exchanger are soldered, in particular Nocolok soldered, to one another. In another exemplary embodiment, all the components of the heat exchanger with the exception of the at least one tank cover, in particular the tank covers, are soldered, for example Nocolok soldered, to one another.

Figure 15:
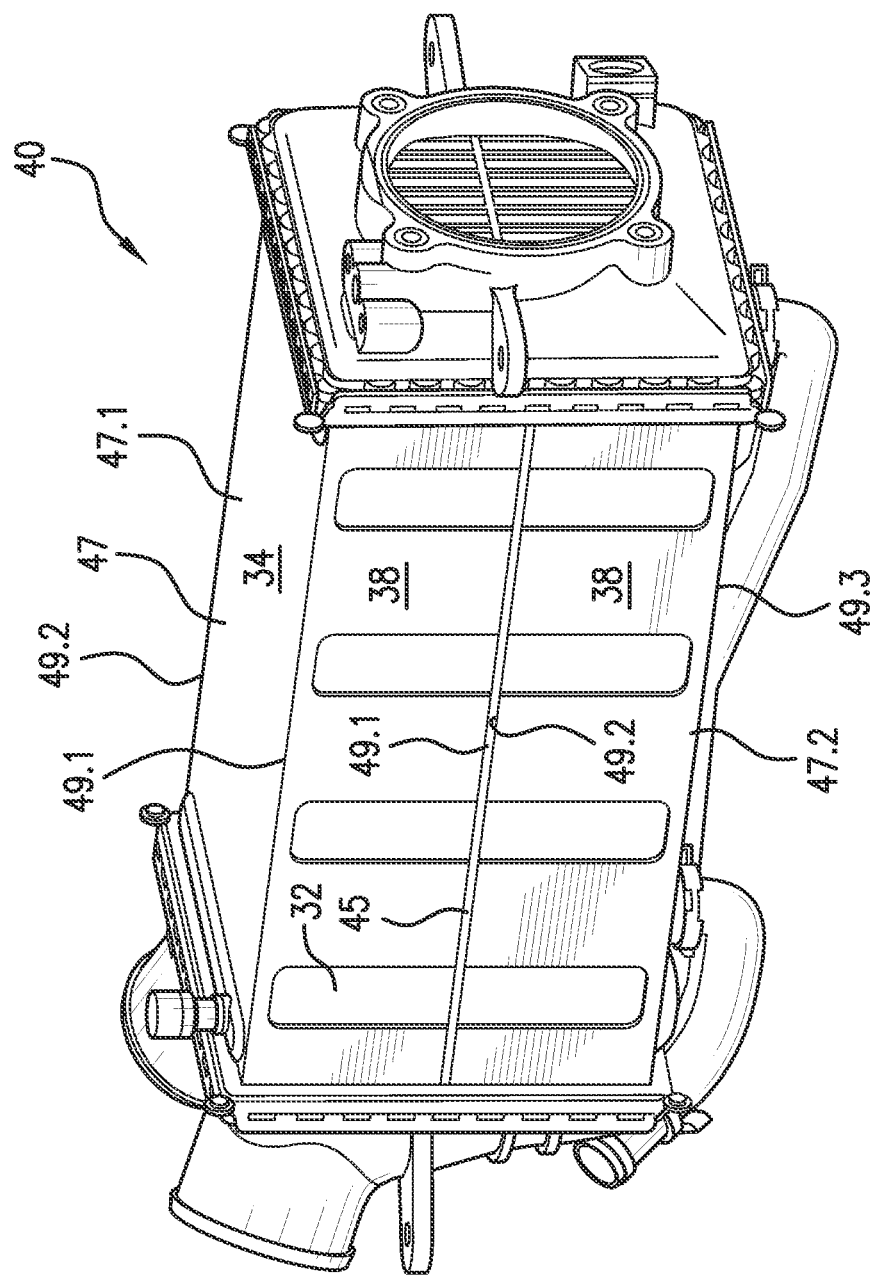
FIG. 15 shows a perspective illustration of yet a further preferred embodiment of the heat exchanger similar to that as per FIG. 13 and FIG. 14, with, in contrast, an intermediate base engaging into a gap formed by opposite parting edges of U-shaped housing parts.
Figure 16:
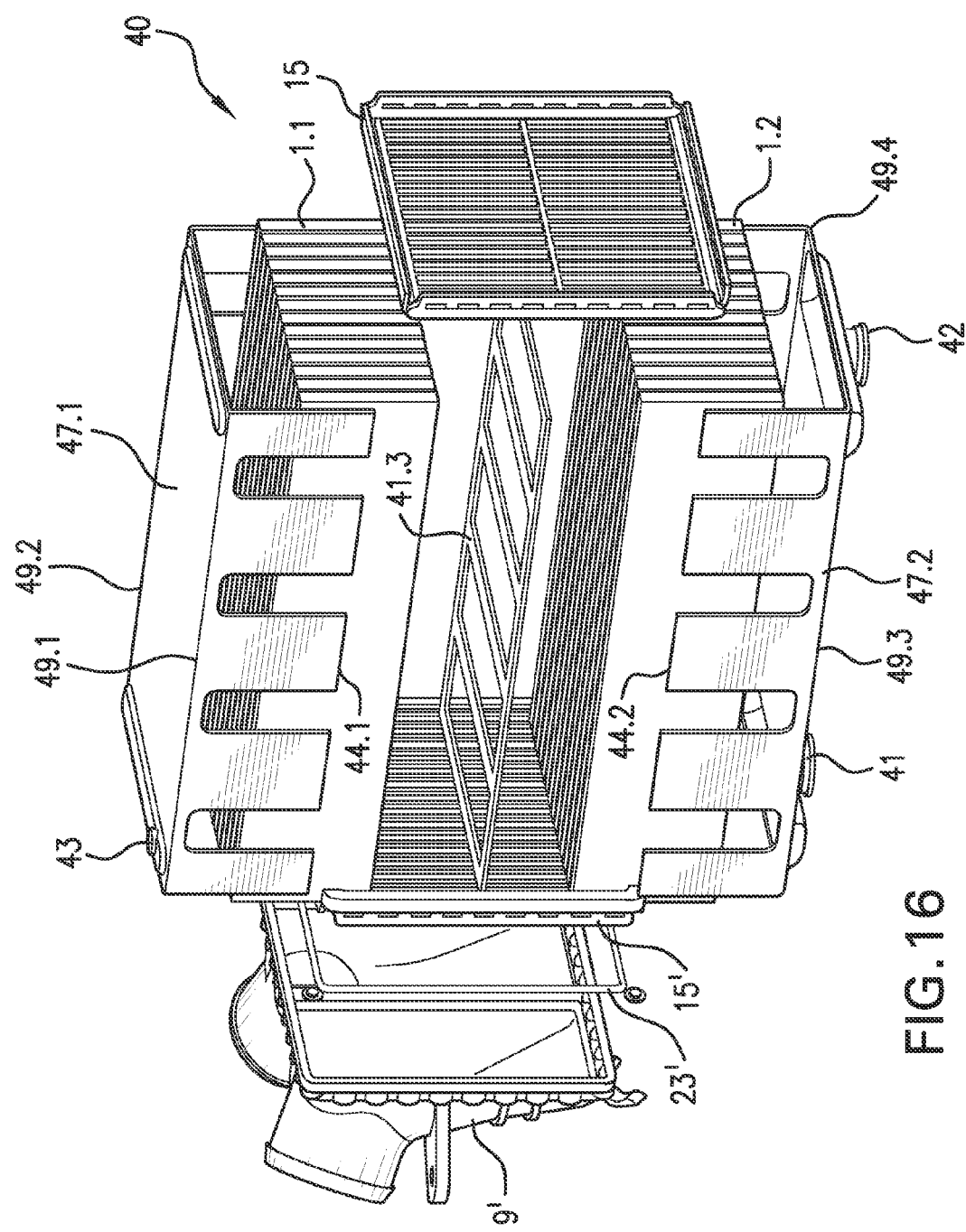
FIG. 16 shows an exploded illustration of the heat exchanger shown in FIG. 15.

FIG. 15 shows a perspective illustration, and FIG. 16 shows an exploded illustration, of a further embodiment of a heat exchanger 40 in the form of a charge-air cooler, the housing 47 of which is again formed from an upper housing part 47.1 and a lower housing part 47.2, with the housing parts 47.1 and 47.2 being practically identical to the housing parts 37.1 and 37.2 of FIG. 13—of U-shaped design. The opposing parting edges 44.1, 44.2 of the housing parts 47.1, 47.1 again form a gap 45, into which an intermediate base 48, illustrated in more detail in FIG. 16, engages. Here, the block 1 has a first arrangement 1.1 and a second arrangement 1.2 of flow ducts 5, with the first arrangement 1.1 and the second arrangement 1.2 being arranged on opposite sides of the intermediate base 48. At least some of the components of the heat exchanger are soldered, in particular Nocolok soldered, to one another. In another exemplary embodiment, all the components of the heat exchanger with the exception of the at least one tank cover, in particular the tank covers, are soldered, for example Nocolok soldered, to one another.

It can be seen from the illustrations in FIG. 13 to FIG. 16 that a heat exchanger 30, 40 having the U-shaped housing parts 37.1, 37.2, 47.1, 47.2 can be bundled in a particularly simple manner, wherein in the embodiment illustrated in FIG. 13 and FIG. 14, a web 46 is utilized for sealing the gap 45 between the parting edges 44.1 and 44.2, while in the embodiment illustrated in FIG. 15 and FIG. 16, an intermediate base 48 is utilized for sealing the gap 45. The housing parts 37.1, 37.2 and 47.1, 47.2 are in the present case soldered to one another—alternatively, or in addition, the housing parts may also be welded to one another. In a way which is not illustrated, the housing parts may also additionally or alternatively be mechanically joined to one another.

Figure 17:
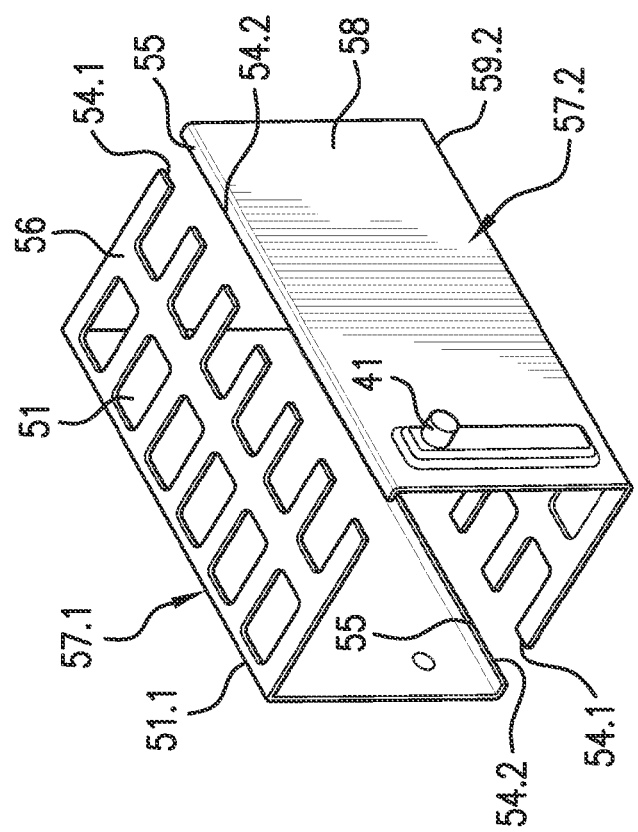
FIG. 17 shows a perspective illustration of yet a further embodiment of a heat exchanger according to the first or second variant of the invention, in which, in a second modification, the housing is formed with L-shaped housing parts and an angled parting edge.

FIG. 17 shows a further embodiment of a heat exchanger 50, in which a housing 57 is formed, in the manner illustrated in FIG. 16, with an upper L-shaped housing part 57.1 and a lower L-shaped housing part 57.2. Again, each L-shaped housing part 57.1, 57.2 forms a housing edge 59.1 and 59.2, and in each case one cover wall 56 and side wall 58 of the housing 57. In the embodiment shown in FIG. 17 and FIG. 18, a cover wall 56 is provided in each case with stiffening areas and/or openings 51, while in the embodiment illustrated in FIG. 13 to FIG. 16, stiffening areas 52 and/or openings are formed on a side wall 38. At least some of the components of the heat exchanger are soldered, in particular Nocolok soldered, to one another. In another exemplary embodiment, all the components of the heat exchanger with the exception of the at least one tank cover, in particular the tank covers, are soldered, for example Nocolok soldered, to one another.

Figure 18:
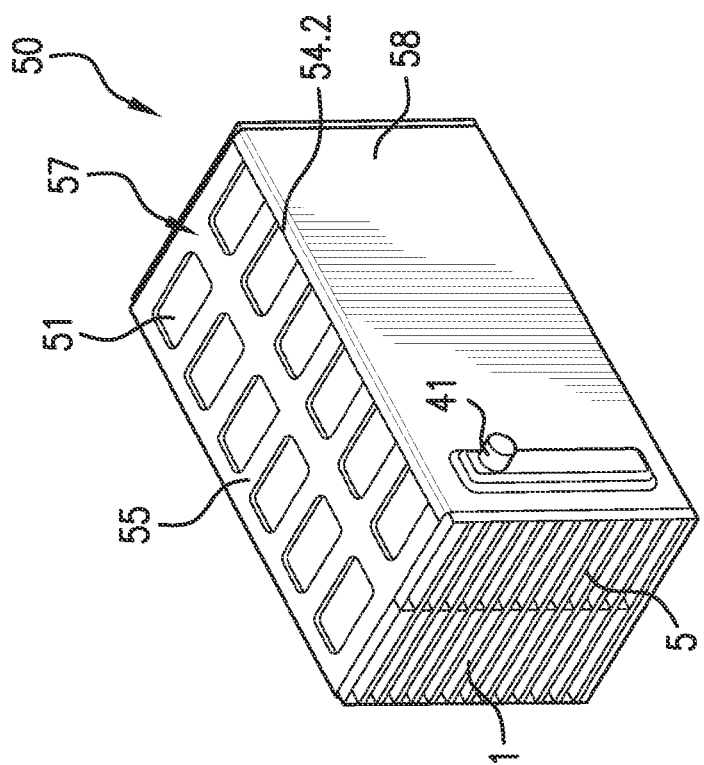
FIG. 18 shows an exploded illustration of the housing of the heat exchanger shown in FIG. 18.

As can be seen from FIG. 18, the first housing part 57.1 and the second housing part 57.2 are again formed correspondingly, such that the entire housing casing of the housing 57 is finished by assembling said first housing part 57.1 and second housing part 57.2 at a parting edge 54.1, 54.2. In the present case, in each case diagonally opposing parting edges 54.2 are provided with a bent lug 55 which—as well as stiffening the L-shaped housing part 57.1, 57.2—also serves for an improved form-fitting fastening of the housing parts 57.1, 57.2. In this regard, in each case one parting edge 54.1 is pushed under the lug 55 of the opposite parting edge 54.2 in order to provide the housing casing of the housing 57. Here, the housing parts 57.1, 57.2 are soldered to one another. At least some of the components of the heat exchanger are soldered, in particular Nocolok soldered, to one another. In another exemplary embodiment, all the components of the heat exchanger with the exception of the at least one tank cover, in particular the tank covers, are soldered, for example Nocolok soldered, to one another.

Overall, the embodiments of a housing 37, 47, 57 illustrated in FIG. 13 to FIG. 18 permit the realization of a multi-part and nevertheless particularly stable housing.

In summary, specified is a heat exchanger 10, 20, 30, 40, 50, in particular a charge-air heat exchanger or exhaust-gas heat exchanger, for an exchange of heat between a first fluid, in particular charge air 3 or an exhaust gas, and a second fluid, in particular a coolant, which heat exchanger has: separate and heat-exchanging guidance, in the block 1, of the first and second fluids, which block 1 has a number of flow ducts 5 which can be traversed by the first fluid and a housing 7, 37, 47, 57 which holds the flow ducts 5 and which can be traversed by the second fluid; at least one casing cover 11, 11' which is flow-connected to the flow ducts 5, a base which is fixed to the casing cover 11, 11' and which is provided with one or with a plurality of passage openings 17 for flow ducts 5. In order to obtain an advantageous connection of the tank cover 11, 11' to the base 15, 15', in particular in the case of the tank cover 11, 11' and base 15, 15' being composed of different materials, and to nevertheless permit expedient production and flexible use of the base, the invention provides that the base 15, 15' is composed of at least one first base part and a second base part, in particular, the tank cover 11, 11' is fixed to the base 15, 15' by means of one or more connections as screw connections 19 and/or slot flanges 26.

The foregoing description of preferred embodiments of the invention has been presented for purposes of illustration and description only. It is not intended to be exhaustive or to limit the invention to the precise form disclosed, and modifications and variations are possible and/or would be apparent in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto and that the claims encompass all embodiments of the invention, including the disclosed embodiments and their equivalents.

What is claimed is:

1. A heat exchanger for an exchange of heat between a first fluid and a second fluid, the heat exchanger comprising:
    a block comprising:
        a plurality of flow ducts configured to be traversed by the first fluid, and
        a housing that holds the flow ducts and is configured to be traversed by the second fluid;
    a base connected to the block, the base including one or more passage openings for the flow ducts, the base comprising a first base part and a second base part; and
    at least one casing cover that is in fluid-communication with the flow ducts and that is attached to the base,
    wherein the base includes a bead formed along an outer periphery thereof, the bead being a groove,
    wherein an end side edge of the at least one casing cover is inserted into the groove, and
    wherein a thickness of the base decreases in a radially outward direction across the bead.

2. The heat exchanger according to claim 1, wherein a ratio of maximum thickness of the base to a minimum thickness of the base is in a range between 2:1 and 4:1.

3. The heat exchanger according to claim 1, wherein a thickness of the base at the bead is smaller than a thickness of the base at a point of the base located at a radially inward side of the bead.

4. The heat exchanger according to claim 1, wherein the housing includes side walls that extend along a flow direction, wherein the housing includes a plurality of housing parts, and wherein at least one of the housing parts forms an edge of the housing.

5. The heat exchanger according to claim 4, wherein at least one of the housing parts is L-shaped.

6. The heat exchanger according to claim 4, wherein the housing is formed of two U-shaped housing parts.

7. The heat exchanger according to claim 4, wherein the housing is formed of two L-shaped housing parts.

8. The heat exchanger according to claim 4, further comprising an intermediate base that is arranged parallel to parting edges of the housing parts.

9. The heat exchanger according to claim 8, wherein the block includes a first arrangement of flow ducts and a second arrangement of flow ducts, and wherein the first arrangement of flow ducts and the second arrangement of flow ducts are disposed on opposite sides of the intermediate base.

10. The heat exchanger according to claim 9, wherein opposite parting edges of the housing parts form a gap.

11. The heat exchanger according to claim 10, wherein the intermediate base engages into the gap formed by the opposite parting edges of the housing parts.

12. The heat exchanger according to claim 4, further comprising a web that covers parting edges of the housing parts.

13. The heat exchanger according to claim 12, wherein the web is arranged at an outside on the housing.

14. The heat exchanger according to claim 12, wherein the web includes a bead.

15. The heat exchanger according to claim 14, wherein the bead of the web engages into a gap formed by opposite parting edges of housing parts.

16. The heat exchanger according to claim 1, wherein the first base part is an inner base part that includes an edge region, and an elevated portion that is elevated above the edge region, the plurality of passage opening extending through the elevated portion.

17. The heat exchanger according to claim 1, wherein the second base part is an outer base part that includes a first limb and a second limb.

18. The heat exchanger according to claim 1, wherein the outer periphery of the base is a corrugated slot flange, the bead being formed in the corrugated slot flange.

19. The heat exchanger according to claim 18, wherein the end side edge of the at least one casing cover is sandwiched between the corrugated slot flange that is provided at a radially outward side of the bead and a portion of the base that is provided at a radially inward side of the bead.

20. The heat exchanger according to claim 1, wherein a seal is wedged between a bottom of the groove and the end side edge of the at least one casing cover.

21. The heat exchanger according to claim 18, wherein a lateral surface of the edge side edge of the at least one casing cover is provided with ribs, the ribs opposing slots of the corrugated slot flange.

\* \* \* \* \*